United States Patent
Niemann et al.

(10) Patent No.: US 10,870,330 B2
(45) Date of Patent: Dec. 22, 2020

(54) METHOD FOR PROTECTING VEHICLE OCCUPANTS

(71) Applicant: HELLA GmbH & Co. KGaA, Lippstadt (DE)

(72) Inventors: Thomas Niemann, Delmenhorst (DE); Christian Jurgens, Stuttgart (DE); Patrick Fuchs, Leonberg (DE); Hauke Baumgartel, Delmenhorst (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 139 days.

(21) Appl. No.: 15/965,475

(22) Filed: Apr. 27, 2018

(65) Prior Publication Data
US 2018/0312032 A1 Nov. 1, 2018

(30) Foreign Application Priority Data
Apr. 27, 2017 (DE) .......................... 10 2017 109 012

(51) Int. Cl.
*B60H 1/00* (2006.01)
*B60R 21/015* (2006.01)
(Continued)

(52) U.S. Cl.
CPC ......... *B60H 1/00757* (2013.01); *B60H 1/008* (2013.01); *B60H 1/00742* (2013.01);
(Continued)

(58) Field of Classification Search
CPC . B60R 2021/01177; B60R 2021/01252; B60R 21/01512; G08B 21/22; B60H 1/00792; B60H 1/00757; B60H 1/00742; B60H 1/008; B60H 1/00978; B60H 1/00821; B60H 1/00642; B60H 1/00; B60H 1/00021; B60H 1/003; B60H 1/0073;
(Continued)

(56) References Cited

U.S. PATENT DOCUMENTS 6,388,410 B1 * 5/2002 Hohn .................. B60R 25/1001
318/445
9,227,484 B1 * 1/2016 Justice .................. B60N 2/002
(Continued)

FOREIGN PATENT DOCUMENTS

DE 19947904 A1 5/2001
DE 102005033404 A1 1/2007
(Continued)

*Primary Examiner* — Anthony R Jimenez
(74) *Attorney, Agent, or Firm* — Muncy, Geissler, Olds & Lowe, PC

(57) ABSTRACT

In a method for protecting vehicle occupants in the passenger compartment of a vehicle, particularly a motor vehicle. It is provided as essential to the invention that at least one structure-borne sound signal is captured by at least one structure-borne sound sensor, the captured structure-borne sound signal is evaluated by at least one evaluation device, the structure-borne sound signal can be produced by at least one person located in the passenger compartment of the vehicle, and after the capture and evaluation of the structure-borne sound signal at least one control signal is sent to a triggering device of an air supply device to introduce air into the passenger compartment of the vehicle.

13 Claims, 2 Drawing Sheets

Figure 1:
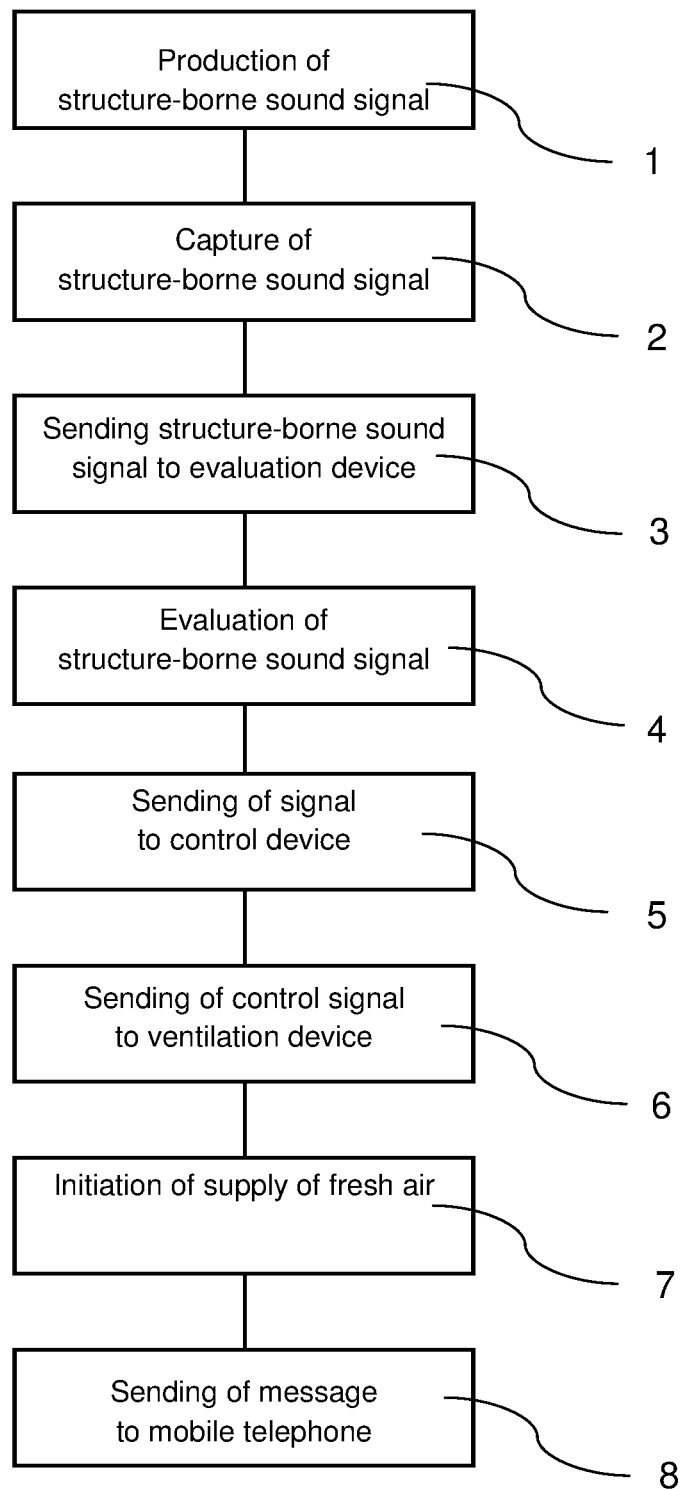

(51) Int. Cl.
    *G08B 21/22*     (2006.01)
    *B60R 21/01*     (2006.01)
(52) U.S. Cl.
    CPC ... *B60H 1/00978* (2013.01); *B60R 21/01512* (2014.10); *G08B 21/22* (2013.01); *B60H 1/00821* (2013.01); *B60R 2021/01177* (2013.01); *B60R 2021/01252* (2013.01)
(58) Field of Classification Search
    CPC .......... B60H 1/00735; B60H 1/00814; B60H 1/00828; B60H 1/00849; B60H 1/00878; B60N 2/002; B60N 2/00; G01H 1/00; G01H 1/04; G01H 1/06; G01H 1/08; G01H 1/12; G01H 1/14; G01H 1/16
    USPC .......................................... 701/45
    See application file for complete search history.

(56)                References Cited

U.S. PATENT DOCUMENTS

| 9,384,647    | B1 * | 7/2016  | Arnold ............... G08B 21/02 |
| 9,428,109    | B2 * | 8/2016  | Binnicker ............. B60Q 9/00 |
| 2015/0306940 | A1   | 10/2015 | Salter et al.                     |

FOREIGN PATENT DOCUMENTS

| DE | 102009061016 B4   | 12/2011 |
| DE | 102015207096 A1   | 10/2015 |
| DE | 102014217382 A1   | 3/2016  |
| DE | 102015013848 A1   | 4/2016  |
| DE | 102015015671 A1   | 7/2016  |
| DE | 102015225840 A1   | 6/2017  |
| WO | WO-2015191722 A1 * | 12/2015 ............ G08B 13/04 |

\* cited by examiner

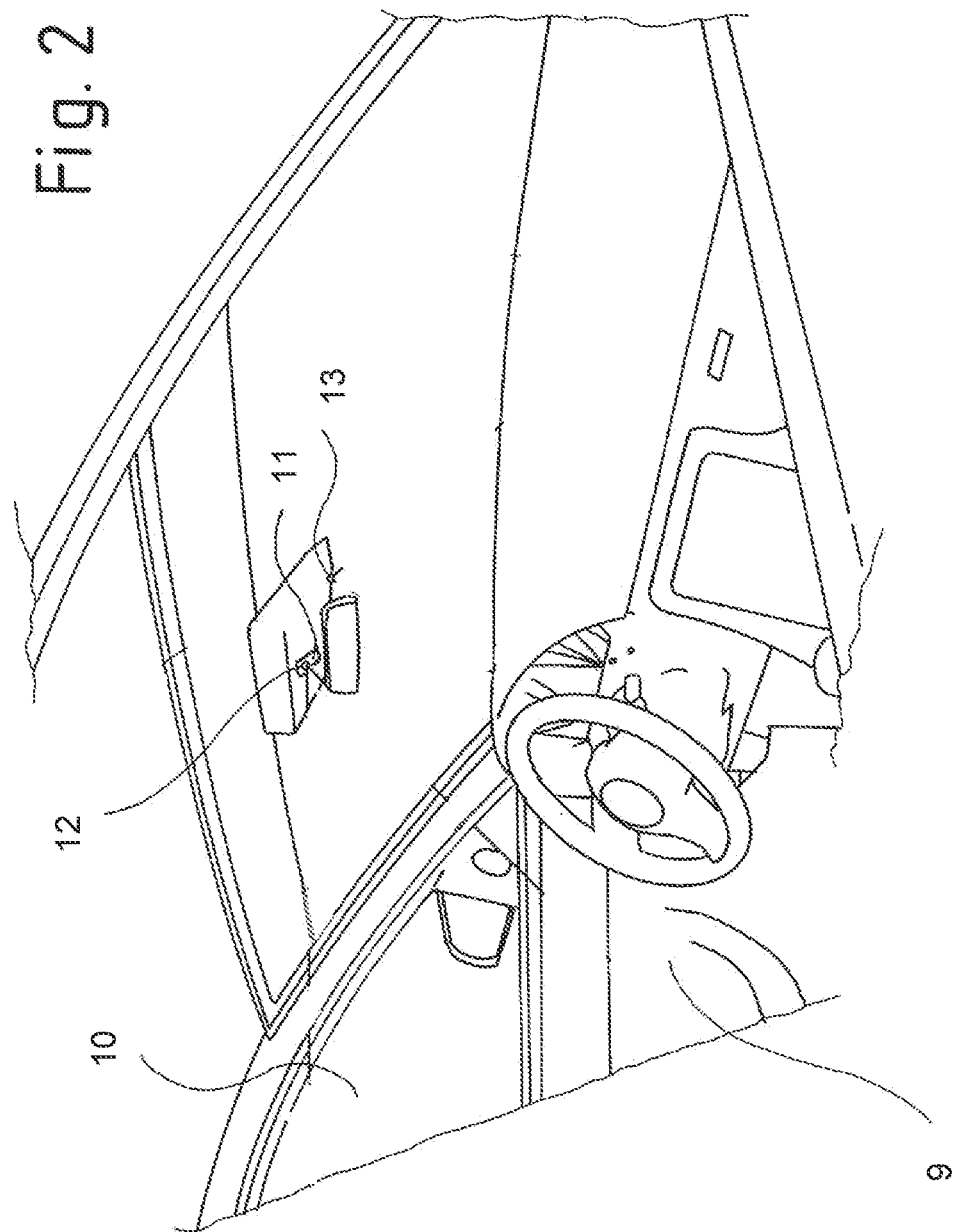

METHOD FOR PROTECTING VEHICLE OCCUPANTS

The invention relates to a method for protecting vehicle occupants in the interior of a vehicle, particularly a motor vehicle. The invention further relates to a vehicle having a device for protecting vehicle occupants from lack of oxygen with at least one structure-borne sound sensor, with at least one evaluation device for evaluating structure-borne sound signals and with at least one air supply device.

If individuals are left in a locked vehicle, for example children while their parents go shopping, there is particular danger that the oxygen content in the interior air in the vehicle passenger compartment may become depleted. This danger can easily be underestimated and/or the vehicle user may be prevented from returning quickly. An increasing temperature in the passenger compartment can lead to a serious danger for the vehicle occupants left in the vehicle. If there is no means for ventilating the vehicle passenger compartment, dangers to the health of the individuals left behind in the vehicle may arise. In most cases, the vehicle occupants in the vehicle are unable to initiated ventilation of the vehicle passenger compartment themselves to supply the passenger compartment with fresh air and possibly also regulate the temperature in the passenger compartment when the vehicle is in the locked state.

The object underlying the invention is to provide a method for protecting vehicle occupants from lack of oxygen.

This object is solved with a method having the features of Patent Claim 1 and with a vehicle having the features of Patent Claim 10. Further embodiments and variants are described in the subclaims.

In a method for protecting vehicle occupants in the passenger compartment of a vehicle, particularly a motor vehicle, it is provided as essential to the invention that at least one structure-borne sound signal is captured by at least one structure-borne sound sensor, that the captured structure-borne sound signal is evaluated by at least one evaluation device, that the structure-borne sound signal can be produced by at least one person located in the passenger compartment of the vehicle, that after the structure-borne sound signal has been captured and evaluated a control signal is sent to a triggering device for an air supply device to introduce air into the passenger compartment of the vehicle, and that at least one signal from at least one passenger compartment monitoring device is incorporated in the evaluation of the structure-borne sound signal.

Individuals who are left behind in the vehicle, such as children for example, are not necessarily able to take steps to introduce fresh air into the passenger compartment of a vehicle. For example, the individuals left behind may not be able to reach the control elements for introducing fresh air, or the possibility exists that they are unable to operate the control elements. It is also possible that the vehicle owner has locked the vehicle and that this may have disabled the control elements for the air supply. The supply of air, particularly fresh air, may be assured for example via a ventilation system, or also by opening at least one window, such as a side window or a roof window for example. If the occupants left behind in the vehicle wish to let in fresh air, to correct a lack of oxygen in the air in the vehicle passenger compartment for example, they have the option to generate a structure-borne sound signal in the vehicle passenger compartment. For example, a person left behind in the vehicle can tap on a window and so produce a structure-borne sound signal which is propagated in the vehicle passenger compartment. The structure-borne sound signal may be captured by a sensor, for example by a structure-borne sound sensor which is arranged in the vehicle. The structure-borne sound signal may be created for example by a tap on a window pane or another surface in the vehicle passenger compartment, so that the structure-borne sound signal can also be produced easily by children for example. The structure-borne sound signal is captured by a structure-borne sound sensor and evaluated by an evaluation device. As part of the evaluation, for example, it may be ascertained whether the source of the structure-borne sound signal is located inside the vehicle passenger compartment. For example, the structure-borne sound signal captured may be compared with a threshold value, and if the threshold value is exceeded the evaluation device may send a signal to a control device. The control device may send a control signal to an actuating device to introduce fresh air into the vehicle passenger compartment. For example, after the capture and evaluation of the structure-borne sound signal, a signal may be sent by the control device to an electric window regulator to at least partly open the window. In this way, tapping on the inside of a window pane may initiate the partial opening of the window, for example, thereby ensure the supply of fresh air. It may be ensured by at least one passenger compartment monitoring device that there are occupants in the parked vehicle. For example, after the capture and evaluation of the structure-borne sound signal the introduction of fresh air may not be started unless it has also been determined by the passenger compartment monitoring device that occupants are located in the vehicle passenger compartment. In this way, for example, instances of window panes being opened unintentionally based on the capture of structure-borne sound signals may be minimised. For this purpose, at least one signal, particularly a monitoring signal may be sent to the evaluation device and/or the control device by at least one passenger compartment monitoring device.

In a further development of the method, the method may be initiated with the vehicle in the locked state. In order to protect individuals inside the vehicle against attacks from outside, the vehicle may be locked by the vehicle owner after the vehicle owner has left the vehicle. For example, the structure-borne sound sensors, particularly the structure-borne sound sensors that are designed to capture structure-borne sound signals propagating inside the passenger compartment, may be switched to an active state by the locking of the vehicle, or said sensors may remain in an active state when the vehicle is locked. Accordingly, the evaluation device and the control device may be be switched to an active state, remain in an active state or be in a standby mode, wherein the devices are activated for example by the capture of a structure-borne sound signal. Thus, the method can be initiated from the inside even when the vehicle is locked by tapping on a surface in the passenger compartment, a window for example, thereby ensuring the supply of oxygen even when the vehicle is locked.

In a further development of the method, at least one window pane, particularly the inside of a window pane, may be monitored by at least one structure-borne sound sensor. For example, an occupant may tap on a side window of the vehicle from the inside, and the structure-borne sound signal generated is captured for example by a structure-borne sound sensor arranged in the side doors. After the capture of the structure-borne sound signal and evaluation thereof by the structure-borne sound sensor and the evaluation device, a window pane, particularly the window pane which was tapped, may be at least partly opened. In this context, for example, the window may be opened a crack by means of the control signal which is sent to the control device that controls the window regulator. This ensures that fresh air can be supplied to the interior of the vehicle passenger compartment, but it is entirely impossible to exit the vehicle passenger compartment through the opening gap.

In a further development of the method, the air supply is assured by activation of at least one electric window regulator. An electric window regulator may be controlled by a control device by means of a control signal, so that the window is at least partly opened.

In a further development of the method, the air supply is assured by switching on at least one ventilation device. As a result of the capture and evaluation of a structure-borne sound signal, a ventilation device, for example a fan device in the vehicle may be switched on to ensure the supply of fresh air to the passenger compartment.

In a further development of the method, the captured structure-borne sound signal is examined for the presence of a previously defined signal pattern, particularly a sequence of taps, and the supply of air is started after the structure-borne sound signal has been tested for previously defined signal patterns. For example, a sequence of taps, or a tap pattern may be stored in the evaluation device, and a captured structure-borne sound signal is tested for the presence of such. Thus, a certain sequence of taps, that is to say a rhythm is needed in order to initiate the introduction of fresh air.

In a further development of the method, at least one passenger compartment monitoring system is at least one seat occupancy sensor and/or at least one passenger compartment microphone and/or at least one passenger compartment camera and/or at least one air quality sensor. A seat occupancy sensor, passenger compartment microphone or a passenger compartment camera may be used to determine without doubt whether there are occupants in the passenger compartment of a vehicle. Signals from these monitoring devices may be included in the evaluation of a captured structure-borne sound signal, in order to prevent a supply of air to be the vehicle passenger compartment from being triggered accidentally. With an air quality sensor, for example, the carbon dioxide content of the air in the vehicle passenger compartment may be monitored. In this way, it may be determined whether it is necessary to introduce fresh air into the passenger compartment. If the air quality values are good, for example, the initiation of the window opening operation may still be prevented despite the capture of a corresponding structure-borne sound signal. Measurement values of the passenger compartment temperature which are captured by a passenger compartment thermometer for example may also be included in the evaluation of a corresponding structure-borne sound signal to lower the passenger compartment temperature by ventilation for example.

In a further development of the method, at least one signal from at least one environmental monitoring device in the vehicle is included in the evaluation of the structure-borne sound signal. Besides signals and/or measurement values from the passenger compartment monitoring devices, signals from at least one environmental monitoring device in the vehicle may be included in the evaluation of the structure-borne sound signals. An environmental monitoring device may be a camera system for example, which may be used to monitor the environment outside the vehicle. The environmental monitoring device may also be an acoustic system, such as for example an external microphone, a temperature monitoring device, a proximity sensor or other monitoring systems. When capturing a structure-borne sound signals while the vehicle is in the locked state, for example, a signal from the environmental monitoring device may be used to ensure that the captured structure-borne sound signal was produced by an occupant of the vehicle in the vehicle passenger compartment and not by persons outside the vehicle tapping on the vehicle's outer shell, for example. For this purpose, a signal may be sent from an environment camera of the vehicle to the evaluation device, for example, wherein the signals nay be evaluated for the purpose of determining whether there are people in the vicinity of the vehicle. If there are people in the vicinity of the vehicle, the introduction of fresh air by actuating an air supply may be prevented, for example. It may further be possible that only a fresh air supply by the opening of a window pane is prevented, and only a fresh air supply by actuation of a ventilation device is initiated. Preventing the window from opening serves to prevent interventions from outside into the vehicle.

In a further development of the method, when the air supply is switched on at least one notification is sent to at least one previously specified mobile telephone, particularly to at least a mobile telephone of the vehicle owner. For example, a message may be sent to the vehicle owner, for example by means of a special software program installed on the mobile telephone, or also via a messaging service. The vehicle owner may be informed by the message of the fact that a supply of fresh air to the vehicle passenger compartment was initiated, that is to say for example a window is at least partly open. This enables the vehicle owner to decide whether he wishes to return to the vehicle. Measurement values from the passenger compartment monitoring system such as the carbon dioxide value, a current photo image of the vehicle passenger compartment, a video recording or an audio recording for example may also be sent to the mobile telephone, particularly the smartphone. The transmission of live signals may also be enabled. It may further be provided that the vehicle owner is able to decide whether fresh air should be supplied by actuation of a ventilation device and/or by opening or partly opening a window pane.

The invention further relates to a vehicle with a device for protecting vehicle occupants from lack of oxygen, having at least one structure-borne sound sensor, having at least one evaluation device for evaluating structure-borne sound signals, having at least one air supply device and having at least one control device for controlling the at least one air supply device, in which it is provided as essential to the invention that at least one structure-borne sound sensor for capturing a structure-borne sound signal whose source is located in the vehicle passenger compartment is connected to at least one region of the passenger compartment of the vehicle so as to conduct structure-borne sound, that the evaluation device is connected to the at least one control device in signal conducting manner, and that the evaluation device is connected to at least one passenger compartment monitoring device in signal conducting manner. Structure-borne sound sensors are fitted in many vehicles, particularly in motor vehicles, for detecting accidents or similar impacts by objects on the outer shell of the vehicle. Structure-borne sound sensors may be fitted in the wings and doors, for example, to detect contacts at these sites. The fitted structure-borne sound sensors may also be connected to regions of the vehicle passenger compartment in such manner as to conduct structure-borne sound, in order to detect structure-borne sound signals propagating in the passenger compartment of the vehicle. Moreover, structure-borne sound sensors provided specifically for this purpose may also be arranged in the passenger compartment. A structure-borne sound signal may be produced by a vehicle occupant for example by tapping on a window pane, a side window, for example. By tapping on the interior surface of the window of a vehicle passenger compartment, the vehicle occupant may indicate for example that fresh air should be introduced into the vehicle passenger compartment. The structure-borne sound signals captured by the structure-borne sound sensors are passed to an evaluation device, via wire connections, for example. In the evaluation device, the captured structure-borne sound signal is examined to determine whether the stored parameters of a structure-borne sound signal indicating a wish for the supply of fresh air are fulfilled. If the corresponding parameters are fulfilled, a signal is sent to a control device, by which measures for supplying fresh air may be initiated. For this purpose, the control device may be connected for example to electronic window regulators or to a ventilation device is such manner as to allow the passage of control signals. The supply of fresh air may thus be initiated by the captured structure-borne sound signal. A passenger compartment monitoring device may be for example an air quality sensor, a passenger compartment microphone, a passenger compartment camera or a seat occupancy sensor. The passenger compartment monitoring devices enable further parameters to be included in the evaluation, so that it may be verified for example whether there are occupants in the vehicle passenger compartment, and whether it is necessary to enable the supply of fresh air.

In a further development of the invention, the evaluation device is connected to at least one environmental monitoring device in signal conducting manner. An environmental monitoring device may be for example an external camera of the vehicle, or also an external microphone for monitoring the areas surrounding the vehicle. The monitoring signals from the external area monitoring device enable further parameters to be used in the evaluation of the captured structure-borne sound signals, so that it may be determined without doubt whether a captured structure-borne sound signal was produced in the passenger compartment or on the outer shell of the vehicle. For example, with the visual monitoring of the area surrounding the vehicle it is possible to determine whether for example people are present in the area surrounding the vehicle who might have produced the captured structure-borne sound signal on the outer shell of the vehicle for example. The environmental monitoring devices may also be temperature measurement devices for capturing the temperature distribution in the area around the vehicle, so that a conclusion can be drawn about the positions of people in the area surrounding the vehicle from the captured temperature distributions. Proximity sensors, such as ultrasound sensors for example may also be used to monitor the area surrounding the vehicle.

In a further development of the invention, the evaluation device is connected in signal conducting manner with a transmitting device for transmitting at least one message to at least one mobile telephone. The vehicle may be equipped with a transmitting device with which a connection may be made to a mobile telephone, particularly the user's and/or the vehicle owner's mobile telephone. In this way, when a control signal is sent to initiate the supply of fresh air into the vehicle passenger compartment a message may be sent to the corresponding mobile telephone to the effect that for example the window of the vehicle was opened.

In the following text, the invention will be explained further with reference to an exemplary embodiment thereof represented in the drawing. In detail:

FIG. 1: is a schematic diagram illustrating the sequence of the method, and

FIG. 2: is a schematic representation of the passenger compartment of a vehicle with passenger compartment monitoring devices.

FIG. 1 is a schematic diagram illustrating the sequence of the method according to the invention. By creating a structure-borne sound signal 1, an occupant left behind in the vehicle is able to express the wish for fresh air to be introduced into the vehicle passenger compartment. The structure-borne sound signal, which is produced for example by tapping on an inner window surface, is captured 2 by means of a structure-borne sound sensor. The structure-borne sound signals captured by the structure-borne sound sensors are forwarded 3 to an evaluation device. In the evaluation device the structure-borne sound signals are evaluated 4. In particular in the course of the evaluation 4 of the structure-borne sound signals an examination may be made to determine whether the structure-borne sound signals match the parameters specified for enabling the initiating the supply of fresh air. After the evaluation 4 of the structure-borne sound signals, a signal is sent 5 to a control device. The control device sends a control signal 6 to a fresh air supply device, to an electric window regulator or the ventilation device, for example. The fresh air supply is initiated 7 for example by the at least partial opening of at least one window or the activation of a ventilation device. A control signal may also be sent to a transmitting device, so that the transmitting device sends 8 a message to the vehicle owner's mobile telephone.

FIG. 2 is a representation in perspective view of part of the passenger compartment of a vehicle, wherein passenger compartment monitoring devices are arranged in the passenger compartment. Structure-borne sound sensors 9 may be arranged in the vehicle doors and designed to capture structure-borne sound signals which propagate inside the vehicle passenger compartment. The structure-borne sound signal may be created by tapping on a window 10 for example. In order to ensure that there are occupants in the passenger compartment, signals from the passenger compartment monitoring system are included in the evaluation of the structure-borne sound signals. The passenger compartment monitoring devices may be a seat occupancy sensor 11, a passenger compartment camera 12, a passenger compartment microphone 13 or also an air quality sensor.

All of the features described in the preceding description and in the claims can be combined in any permutation with the features of the independent claims. The disclosure of the invention is thus not limited to the feature combinations that are described and claimed, but rather all feature combinations that are practicable within the scope of the invention are to be considered disclosed.

The invention claimed is:

1. A method for protecting vehicle occupants in a passenger compartment of a vehicle, comprising:
   capturing at least one structure-borne sound signal by at least one structure-borne sound sensor;
   evaluating the at least one structure-borne sound signal by at least one evaluation device; and
   after said capturing the at least one structure-borne sound signal and evaluating the at least one structure-borne sound signal, sending at least one control signal to a triggering device of an air supply device for introducing air into the passenger compartment of the vehicle,
   wherein the at least one structure-borne sound signal is produced by at least one person located in the passenger compartment of the vehicle, and wherein at least one signal from at least one passenger compartment monitoring device is included in said evaluating the at least one structure-borne sound signal.

2. The method according to claim 1, wherein the method can be started with the vehicle in a locked state.

3. The method according to claim 1, wherein at least an inner surface of at least one window pane is monitored by the at least one structure-borne sound sensor.

4. The method according to claim 1, wherein the at least one passenger compartment monitoring device consists of at least one seat occupancy sensor and/or at least one passenger compartment microphone and/or at least one passenger compartment camera and/or at least one air quality sensor.

5. The method according to claim 1, wherein at least one signal from at least one environmental monitoring device of the vehicle is included in said evaluating the at least one structure-borne sound signal.

6. The method according to claim 1, wherein air is supplied by actuation of at least one electronic window regulator.

7. The method according to claim 6, wherein the air is supplied by switching on of at least one ventilation device.

8. The method according to claim 7, further comprising:
examining the at least one structure-borne sound signal for a previously defined signal pattern; and
starting supplying the air after said examining the at least one structure-borne sound signal for the previously defined signal pattern is completed,
wherein the predefined signal pattern is a tapping sequence.

9. The method according to claim 7, further comprising sending at least one notification, when the at least one ventilation device is switched on, to at least one previously specified mobile telephone.

10. A vehicle with a device for protecting vehicle occupants, said vehicle comprising:
at least one evaluation device configured to evaluate structure-borne sound signals;
at least one air supply device;
at least one control device, configured to control the at least one air supply device, connected to the at least one evaluation device;
at least one structure-borne sound sensor configured to capture a structure-borne sound signal whose source is located in the vehicle passenger compartment, the structure-borne sound signal being connected to at least one region of the passenger compartment of the vehicle so as to conduct a structure-borne sound; and
at least one passenger monitoring device connected to the at least one evaluation device.

11. The vehicle according to claim 10, further comprising at least one environmental monitoring device connected to the evaluation device.

12. The vehicle according to claim 10, further comprising a transmitting device connected to the evaluation device, the transmitting device being configured to transmit at least one message to at least one mobile telephone.

13. A method for protecting vehicle occupants, the method comprising:
capturing at least one structure-borne sound signal by at least one structure-borne sound sensor;
evaluating the at least one structure-borne sound signal by at least one evaluation device;
after said capturing the at least one structure-borne sound signal and said evaluating the at least one structure-borne sound signal, sending at least one control signal to a triggering device of an air supply device for introducing air into a passenger compartment of a vehicle;
examining the at least one structure-borne sound signal for a previously defined signal pattern, the previously defined signal pattern is a tapping sequence; and
starting a supply of air after said examining the at least one structure-borne sound signal for the previously defined signal pattern is completed,
wherein the at least one structure-borne sound signal is produced by at least one person located in the passenger compartment of the vehicle, and
wherein at least one signal from at least one passenger compartment monitoring device is included in said evaluating the at least one structure-borne sound signal.

* * * * *